United States Patent [19]

Ebeling et al.

[11] 3,910,434

[45] Oct. 7, 1975

[54] MECHANICALLY ACTUATED SIDE LOADING ARRANGEMENT FOR A VEHICLE BODY

[76] Inventors: Franklin D. Ebeling; Ernest C. Ebeling, both of P.O. Box 1747, Plainview, Tex. 79072

[22] Filed: Oct. 29, 1973

[21] Appl. No.: 410,405

[52] U.S. Cl. ................................. 214/302; 214/313
[51] Int. Cl.² ........................................... B65F 3/04
[58] Field of Search ............ 214/302, 303, 313, 315

[56] References Cited
UNITED STATES PATENTS

| | | | |
|---|---|---|---|
| 3,773,197 | 11/1973 | Blakeley et al. | 214/302 |
| 3,790,011 | 2/1974 | Owen | 214/302 |

*Primary Examiner*—Robert B. Reeves
*Assistant Examiner*—John P. Shannon
*Attorney, Agent, or Firm*—Wayland D. Keith; Max E. Shirk

[57] ABSTRACT

A loading arrangement for a vehicle body, which loading arrangement is operated by the driver of the vehicle to pick up containers of material, without human assistance, elevate the containers to the top of the vehicle body, discharge the material into the vehicle body and return the container to the desired location a spaced distance outward from the vehicle, retract the container pick-up mechanism to enable the vehicle to be readily roadable. The container pick-up mechanism may be provided on either or both sides of the vehicle and the operator of the vehicle may operate either or both mechanisms from his driving position in the vehicle. The vehicle is provided with a plunger arrangement to discharge the material from the body of the vehicle.

23 Claims, 13 Drawing Figures

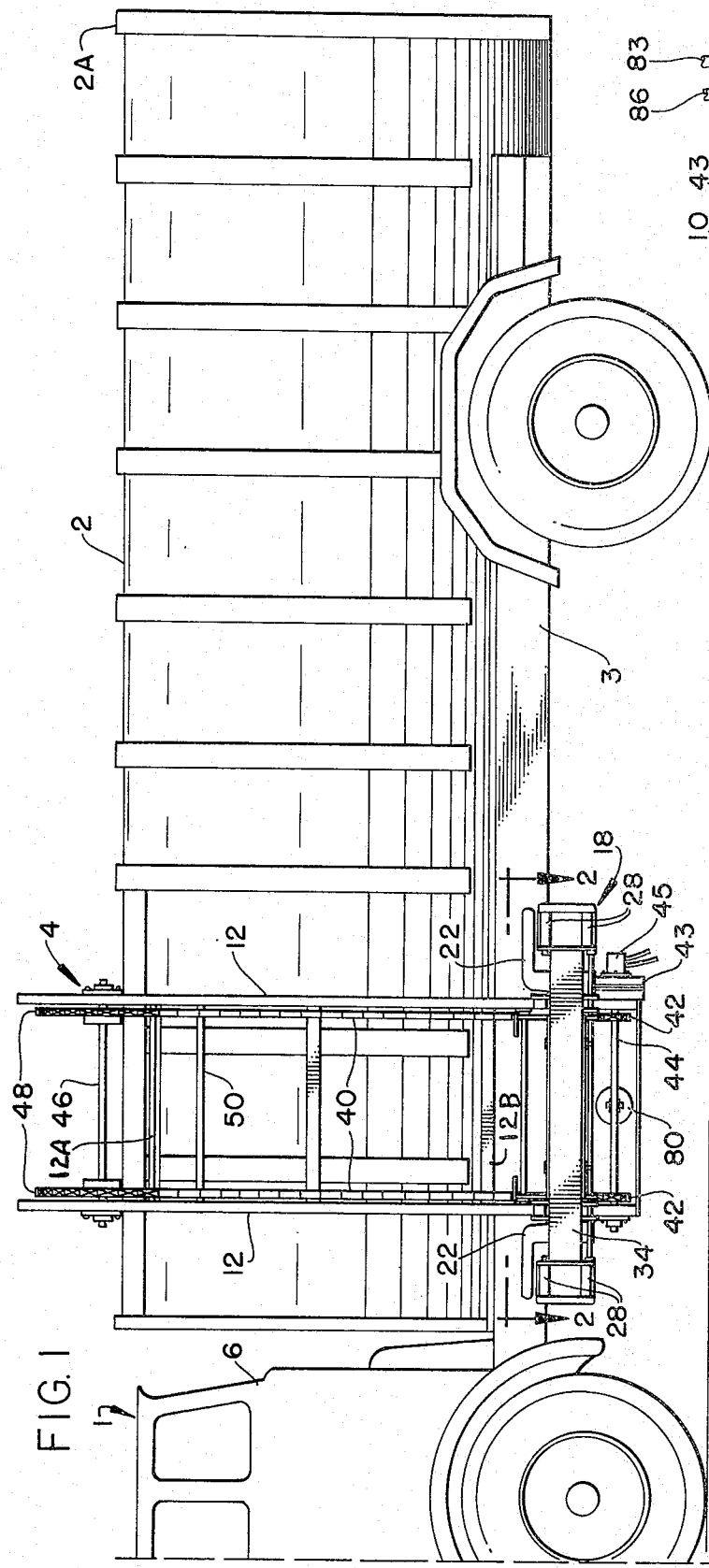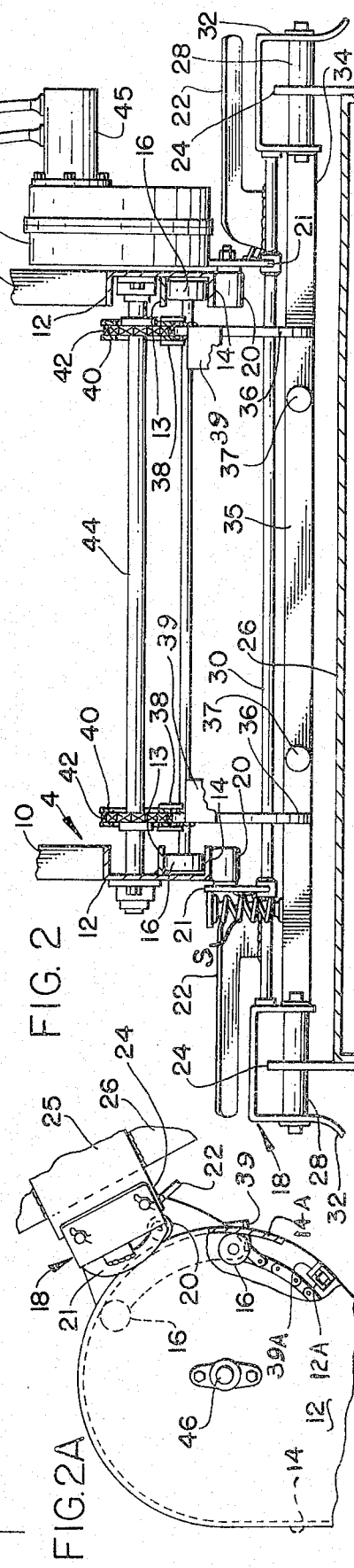

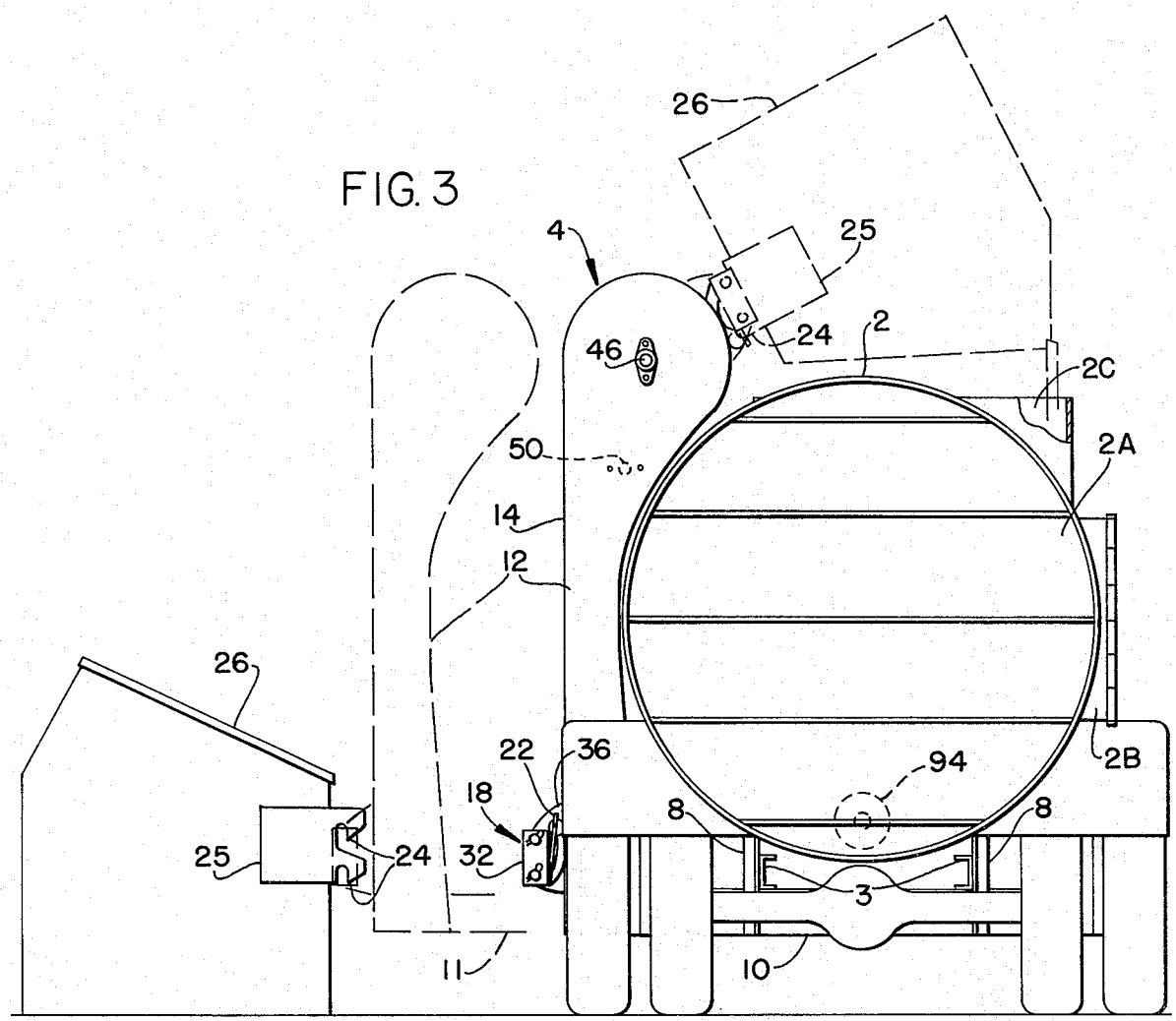
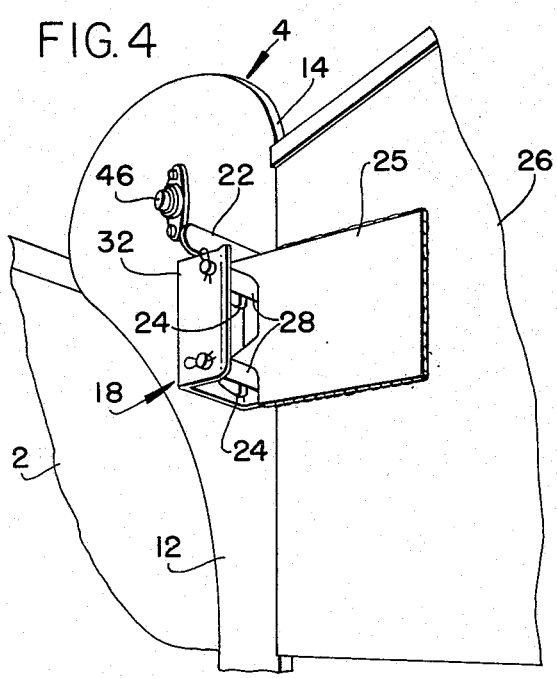
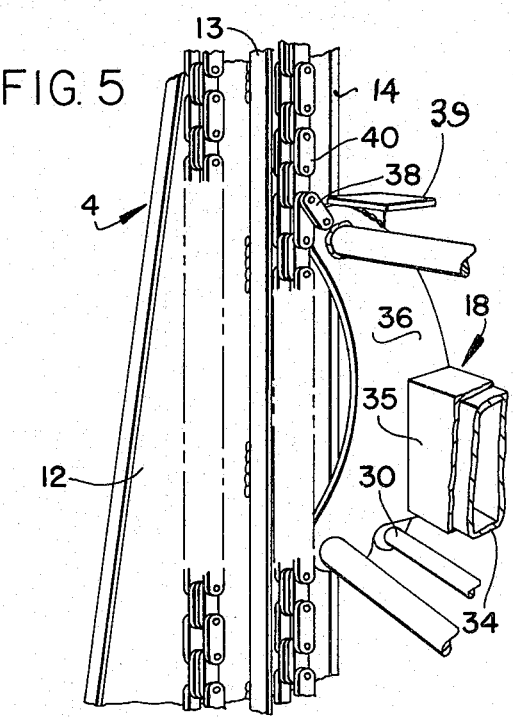

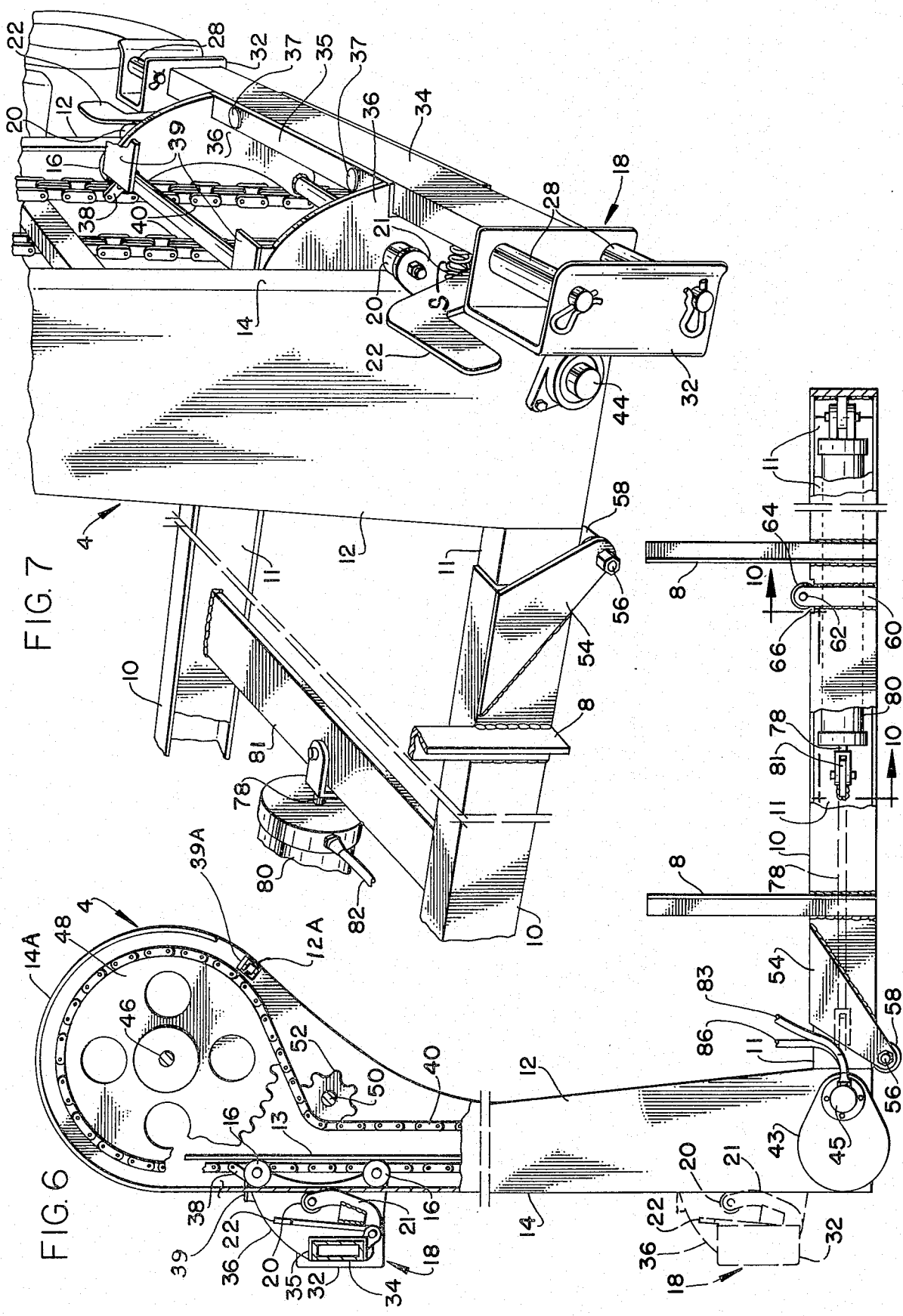

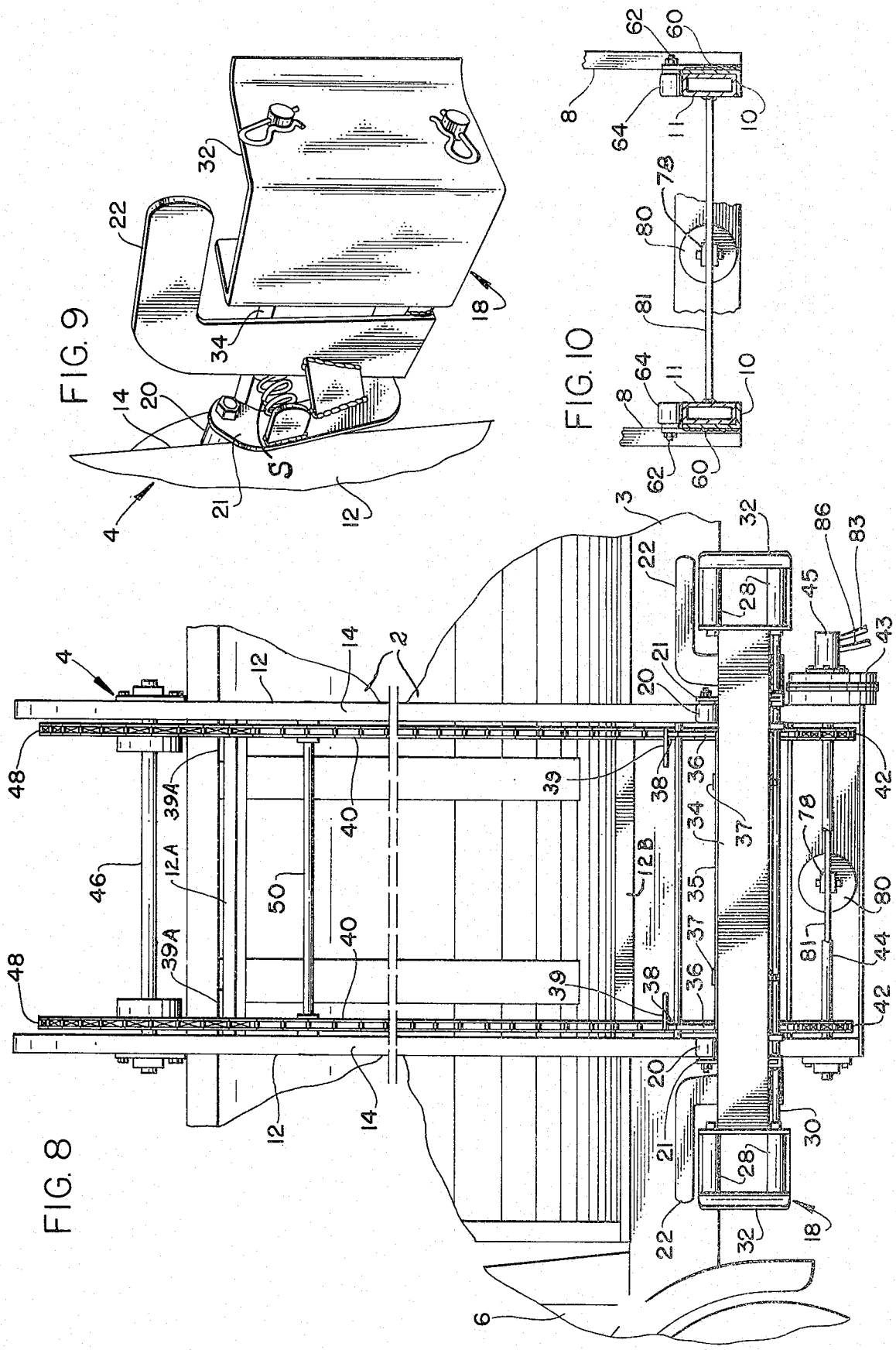

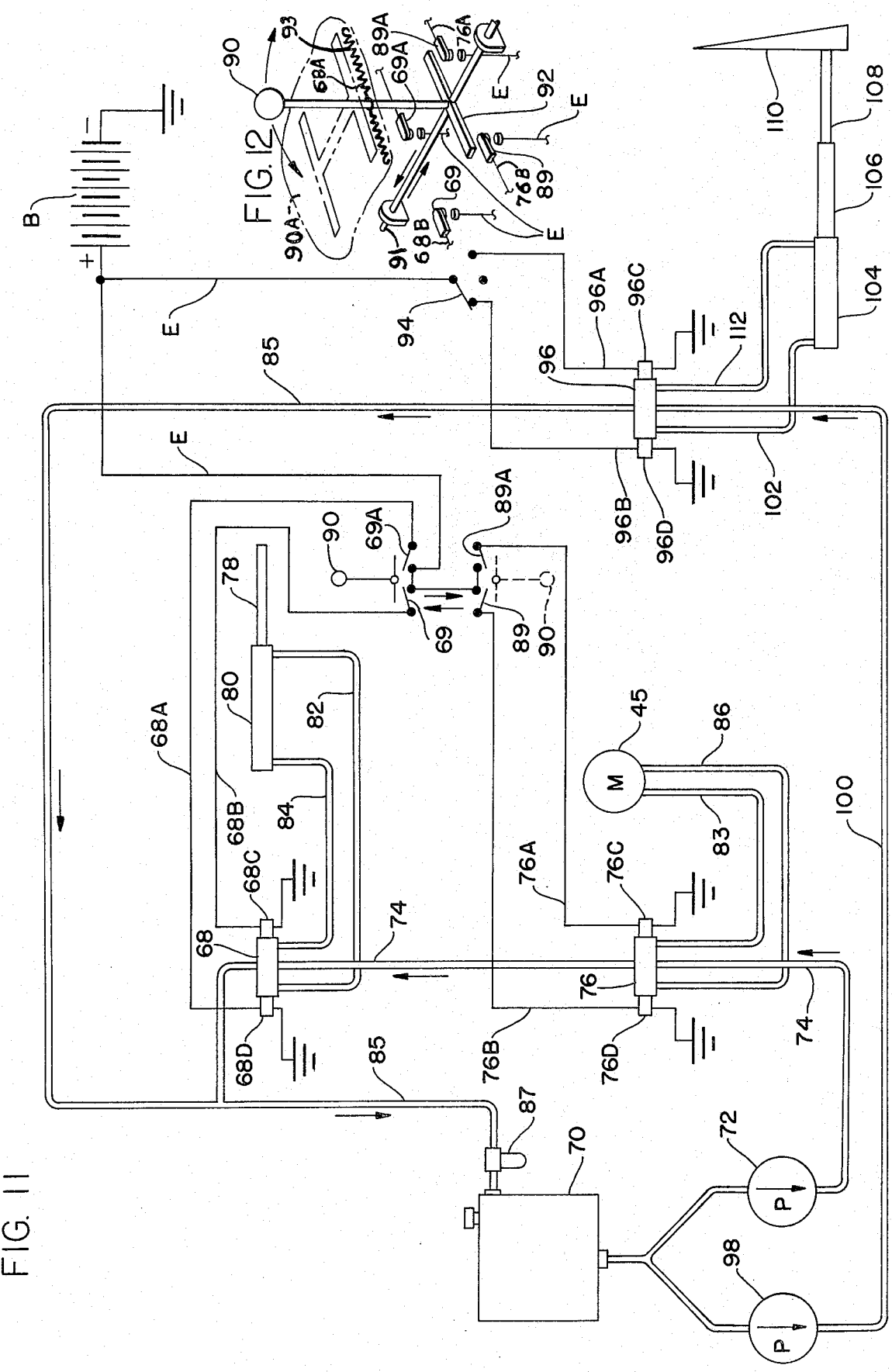

3,910,434

MECHANICALLY ACTUATED SIDE LOADING ARRANGEMENT FOR A VEHICLE BODY

BACKGROUND OF THE INVENTION

This invention is primarily concerned with the picking up, elevating and dumping of containers, from a vehicle, by the operator of the vehicle while in driving position, and returning the empty container to the desired level and moving the container outward to a desired location to receive garbage, all of which is done entirely by mechanical means operated by the operator of the vehicle. While the pick up of garbage is one of the primary uses of the device, it is to be pointed out that the mechanism may be used to load other types of material, which is flowable and dumpable, and it is desirable that such material be loaded from a side of the vehicle, when the picking up, dumping and relocating the container must be carried out in somewhat confined space. After the vehicle body is filled with material, it is moved to a suitable place of disposal and the material discharged from the vehicle body by a ram, such as a hydraulically actuated plunger, in a manner well understood in the art of discharge means for vehicle bodies.

DESCRIPTION OF THE PRIOR ART

Various types of side loaders for vehicles have been proposed heretofore, but these, for the most part, were complex in construction, and many required additional personnel to attach and detach the container, or to load a special container while the container is still attached to the elevating device of the garbage truck or the like.

OBJECTS OF THE INVENTION

An object of this invention is to provide a driver operated, mechanical device to engage and pick up a container a spaced distance outward from a vehicle body, direct the container upward, dump the contents thereof into the vehicle body, and move the empty container downwardly and outwardly to the position it originally occupied, and return the pick-up device into close relation to the vehicle.

Another object of the invention is to provide a container engaging mechanism which may be moved out from a side of a vehicle the desired distance, engage the container and move the container inward and upward to an inverted position to dump the material within the container into the body of the vehicle.

A further object of the invention is to provide a cam actuated locking mechanism to lock the elevated container with respect to the conveyor chain to enable the container to be inverted to direct the material therefrom into the vehicle body.

Still another object of the invention is to provide a vehicle container pick-up device on a side of the vehicle to be moved outwardly by a hydraulic cylinder to engage a container when in one position and to move the container outwardly to be disengaged, when in another position.

Yet a further object of the invention is to provide mechanism to engage and elevate a container of material, such as garbage, to a point above a vehicle body, to dump the material into the vehicle body, which mechanism is operated entirely by the operator of the vehicle from his position in the cab of the vehicle.

Still another object of the invention is to provide an arrangement for picking up, dumping and replacing the container to a side of the vehicle, which is simple in construction, effective in operation, has a minimum of operating parts to accomplish the desired results, and which is relatively low in the cost of manufacture.

DESCRIPTION OF THE DRAWINGS

With these objects in mind and others which will become manifest as the description proceeds, reference is to be had to the accompanying drawings in which like reference characters designate like parts in the several views thereof, in which:

FIG. 1 is a fragmentary elevational view of a vehicle, showing, on a side thereof, a mechanism for engaging containers, lifting the containers and dumping the contents thereof into the body of the vehicle and returning the container to the original position;

FIG. 2 is a sectional view, on an enlarged scale, taken on the line 2—2 of FIG. 1, looking in the direction indicated by the arrows, showing the details of the locking arrangement of the container engaging members, and also showing the power drive for the endless chain elevator and a fragmentary portion of a container attached to the elevating device;

FIG. 2A is an enlarged, fragmentary elevational view of the upper portion of one of the masts, showing the cam roller and a lock for the container hooks, when in dumping position, a portion of the container being shown, and an upper limit stop for the conveyor;

FIG. 3 is an end elevational view of the vehicle in full outline, the container pick-up arrangement mounted on a side of the vehicle being shown in full outline, the container being shown in full outline in one position, the pick-up arrangement to engage the container being shown in dashed outline in one position, with the container being shown in position to discharge the contents thereof into the vehicle body being shown in dashed outline;

FIG. 4 is a fragmentary, perspective view of a portion of the vehicle body, a portion of the elevating mechanism, and showing a portion of the container, with the hooks thereon being in engaged position;

FIG. 5 shows a fragmentary portion of the elevating device, with parts being broken away and with parts shown in dot-dash outline, and showing a member attaching the container pick-up arrangement to the elevating chain;

FIG. 6 is a side elevational view, on an enlarged scale, with parts being broken away, and with parts shown in dashed outline, of the container pick-up and elevating device, shown apart from the vehicle;

FIG. 7 is a perspective, fragmentary view, on an enlarged scale, of the lower part of the container pick-up mechanism, with parts broken away, and with parts shown in section, a portion of the vehicle to which the mechanism is attached being shown;

FIG. 8 is a fragmentary elevational view of the vehicle showing the container pick-up and elevating device, with parts broken away and shortened to bring out the details of construction;

FIG. 9 is a greatly enlarged view of the container pickup interengaging member, showing locking members to move in blocking relation with respect to the hooks on the container to enable the container to be inverted while still attached to the endless conveyor chain;

FIG. 10 is a sectional view taken on the line 10—10 of FIG. 6, looking in the direction indicated by the arrows, showing the relation of the support rollers FIG. 11 is a diagrammatic view showing the hydraulic system and the electrical system for actuating the container pick-up and dumping mechanism and the mechanism for discharging the contents of the vehicle body; and FIG. 12 is a diagrammatic perspective view of the mechanically interlocking switching mechanism, showing the several switches, showing the switch plate removed, and showing a fragmentary portion thereof in dot-dash outline.

DESCRIPTION OF THE PREFERRED EMBODIMENTS OF THE INVENTION

With more detailed reference to the drawing, the numeral 1 designated generally a vehicle, which vehicle has a body 2 and a frame 3 thereon. The body 2 has an end gate 2A hingeably connected thereto by a hinge 2B, FIG. 3, which body 2 has an opening 2C in the top thereof, near the forward end, to receive material to be hauled, such as garbage. The vehicle 1 has a container pick-up and elevating device of loader or loaders, generally designated at 4, attached to one or both sides thereof, which loader or loaders are operable by the operator of the vehicle from the cab 6 thereof. The container loader 4 is shown apart from the vehicle in FIG. 6, and has mounting support members 8 extending upward from the transverse mounting frame 10 thereof, which support members are secured to the frame 10, as by welding. The support members 8 are secured, near the upper ends thereof, to the frame 3 of the vehicle 1. Although a vehicle loader is shown as being positioned on the left hand side of the vehicle, a similar loader device may be positioned, in a similar manner, on the right hand side thereof and is operable by the operator of the vehicle, in the same manner, so as to enable the vehicle to be loaded from either side. However, only one loader device and the mechanism associated therewith will be described, as they are identical. While the present side container loader or pick-up and dumping apparatus, which will replace the container to the original location if desired, is shown to be mounted on a truck, it is to be understood that this mechanism is also adaptable to a trailer type vehicle, thereby enabling one operator to move the vehicle down a street or alley and to pick up containers of garbage, or other material, from both sides of the street or alley at one passage therealong. The material from the containers is compacted into the body of the vehicle to be hauled to a distant place of disposal.

There are two transverse loading frames 10 which are preferably channel members, as will best be seen in FIGS. 7 and 10, and each telescopically receives a rectangular tubular mast support member 11, on each which tubular member 11 and upright mast 12 is fixedly secured, near the outer end thereof. The masts 12 extend upward, as will best be seen in FIGS. 1, 3 and 6. Each mast 12 has a straight flange 13 (FIG. 6). Each mast 12 also has an inturned flange 14 on the outer face thereof, each which flange 14 includes a curved portion 14A extending around the upper periphery of the respective masts for at least 180° to form a face on which rollers 16 will roll to guide a container pickup mechanism, designated generally at 18, upward therealong preparatory to dumping a contents of the container 26, and the return of the container 26 to the normal level.

The container 26 has a plate 25 secured, as by welding, on each side thereof. Each plate 25 is provided with a pair of hooks 24 engageable by a pair of rollers 28 (FIG. 4) mounted on U-shaped brackets 32 in longitudinally spaced-apart relation on a mounting bar 34 (FIGS. 2, 7 and 8).

The outer face of each flange 14 serves as a face to actuate a cam roller 20 to move a container lock 22 above hooks 24. As best seen in FIG. 2, the container hook locks 22 and the mounting brackets 21 for the cam rollers 20 are fixedly secured to arcuately rotatable shaft 30, which shaft is journaled transversely on the container pickup mechanism 18 and is removable therewith.

The container pick-up mechanism 18 is guided in each of the respective masts between flanges 13 and 14 on the respective upright masts 12, as will best be seen in FIGS. 2 and 6 and will be supported on chains 40 by pivoted connector links 38, as will best be seen in FIGS. 5 and 6.

With the container 26 pivotally supported on chains 40 and with the cam rollers 20 moved onto curved flanges 14A, the lock members 22 will be moved from the positions as shown in FIG. 2 to the position as shown in dashed outline in FIG. 3 and in solid lines in FIG. 2A for one of the lock members 22. This locks the hooks 24 against relative movement with respect to rollers 28, whereupon, the container 26 will move with chains 40 to dumping position, as shown in dashed outline in FIG. 3.

The mounting bar 34 is detachably secured within the flanges of a channel 35 by means of detachable pin-like members 37, as will best be seen in FIGS. 7 and 8, to enable the mounting bar 34, the U-shaped brackets 32, rollers 28, cam rollers 20 and locks 22 to be removed from between the flanges of channel 35 to enable other mechanisms to be installed between the flanges of the channel 35 and fastened in place by fastening means 37 to enable the loader to pick up containers having different type projections thereon, such as rollers.

The channel 35 has inwardly extending support members 36 secured near each end thereof, with the upper ends of the inwardly extending support members being pivotally attached by a link 38, to each of the conveyor chains 40, as will best be seen in FIGS. 5 and 7. The upper end of each inwardly extending support member 36 has an abutment plate 39 thereon to form a stop to complementally engage or bump an elastomer bumper 39A which is secured to transverse tubular brace 12A, as will be seen in FIGS. 1, 5, 6, 7 and 8. A brace 12B extends between the lower portions of masts 12. The abutment plate stops 39 enable the container to be moved to an inverted position and to be bumped when the abuttment plates 39 engage bumper 39A. This will cause the contents of the container 26 to be bumped through opening 2C into the body 2 of the vehicle 1. This bumping action may be repeated.

The conveyor chains 40 extend around sprockets 42, which sprockets are mounted on a power driven shaft 44, which shaft is journaled in the masts 12 near the lower ends thereof.

A shaft 46 is journaled in the masts 12 near the upper ends thereof and is parallel with shaft 44. The shaft 46 has sprockets 48 thereon, the axis of which sprockets is above the top of the hollow body 2. The mast, sprockets and chains provide the elevator means for the container The conveyor chain 40 is positioned around sprockets 48. A shaft 50 is also journaled in the masts 12 and has idler sprockets 52 thereon so as to maintain the conveyor chains 40 in proper guided relation with respect to the masts 12. One of the masts 12 has a gear reduction unit 43 on the lower end thereof, which gear reduction unit is connected in driving relation with shaft 44. A motor, such as fluid motor 45 is mounted on gear reduction unit 43 and is connected in driving relation therewith. Each of the masts 12 is secured to the respective rectangular tubular mast support members 11, as will best be seen in FIGS. 3, 6 and 7.

A bracket 54 is secured to each of the members 10, which brackets extend downward and each has a shaft 56 therethrough to journal a roller 58 thereon, which rollers are in contact relation with the lower side of rectangular tubular mast support members 11, near the outer ends of frame members 10, as the masts 12 and container pick-up mechanism 18 move outward and inward, as will best be seen in FIGS. 3 and 6. Each frame member 10 has a bracket 60 fixedly secured thereto, each which bracket has a shaft 62, each which shaft has a roller 64 journaled therein. The rollers extend through the respective notches 66 in frames 10 to be in rolling relation with the upper surface of the respective rectangular tubular mast support members 11, thereby to enable the masts and the container mechanisms to be moved inward and outward, as shown in FIGS. 3 and 6 and as shown in full and dashed outline in FIG. 3, to enable the rollers 28, on the container pick-up mechanism to be moved beneath hooks 24 on each side of the container, as will best be seen in FIGS. 2 and 4, and by slight upward movement of the container pick-up mechanism 18, the rollers will engage the downwardly facing hooks 24 on each side of the container 26 preparatory to moving the container 26 inward from the position shown in full outline in FIG. 3 to a position adjacent the mast, as shown in full outline in FIG. 4.

The switch lever 90, FIGS. 11 and 12, is secured to a longitudinally slidable shaft 91, which shaft has a transverse bar 92 thereon and is moved with the shaft 91 along the longitudinal axis thereof so that the transverse bar will be above switches 69 and 69A or 89 and 89A. Springs 93, which are shown diagrammatically in FIG. 12, return the lever 90 to a vertical position so as to be out of contact with switches 69, 69A, 89 and 89A when the lever is released. The switches are normally of the open type and to maintain the switch in closed condition, the lever 90 may be moved to either of the parallel slots in the plate 90A and rocked to close one of the switches 69, 69A, 89 or 89A, and when the lever is released it will be moved into the position as shown in FIG. 12, by springs 93. The springs, which are preferably leaf-springs, are mounted in cooperative relation with the upright lever 90. The switch 69 has a conductor 68B leading therefrom to solenoid 68C of four-way solenoid valve 68, which is a grounded circuit. The switch 69A is connected with a conductor 68A which leads to solenoid 68D of fourway solenoid valve 68, which solenoid 68D is grounded to form a circuit. This switch interlock arrangement is such that only one switch 69, 69A, 89 or 89A can be closed at one time, which eliminates the hazards to machinery and the like. The electrical system is shown to have a battery B, which is grounded, with conductor E leading therefrom to lead to and through the various switches to operate the various electrical components, which are grounded.

The loading and dumping of garbage into the hollow body 2 and returning the container 26 to its normal position is powered by an electrically controlled hydraulic system, as is the discharge of garbage from the vehicle.

The power supply means include pumps 72 and 98 of a hydraulic system, which system is provided with a reservoir 70 which has a conduit leading therefrom, which conduit is branched, one branch thereof leads to and through pump 72 which pump is operated continuously to direct hydraulic fluid, under pressure, upward and through four-way valve 76, when in neutral position, and through four-way hydraulic valve 68 when in neutral position, and into return line 85 leading to and through filter 87 and back to the reservoir 70.

Upon moving lever 90 to one position and rocking the lever to close switch 69A the current will be directed from conductor E through conductor 68A to solenoid 68D to actuate four-way solenoid valve 68 to direct hydraulic fluid from conduit 74 through four-way valve 68 into conduit 82 to retract plunger 78 into cylinder 80, which plunger 78 is connected with a transverse bar 81 (FIG. 10) which is secured to longitudinally movable support members 11, so as to move the masts 12 inward upon retraction of plunger 78. Upon retraction of plunger 78, the switch lever 90 may be moved to the opposite parallel slot in switch plate 90A and the switch lever moved arcuately to close switch 89A so as to direct current from electrical conductor E through the switch and through conductor 76A to solenoid 76C to move four-way valve 76 into a position to direct hydraulic fluid, under pressure, from conduit 74 to four-way valve 76 into conduit 83 to operate the motor 45 in one direction, with the hydraulic fluid being exhausted out through conduit 86 and fourway valve 76 to the opposite side of the valve and through conduit 74 leading to discharge line 85 and to reservoir 70. The operation of the motor 45 through gear reduction unit 43 will operate the conveyor chain 40 to lift the container 26, which container is pivotally supported on the chain 40 and will be moved upwardly to dump the contents thereof into hollow body 2 of the vehicle 1.

Upon release of lever 90 it will be moved to a neutral position, as shown in FIG. 12, by springs 93, and by moving the lever 90 into position to close switch 89, electrical current will be directed from conductor E through switch 89 to conductor 76B to solenoid 76D to move four-way valve 76 to a position to direct hydraulic fluid, under pressure, from conduit 74 to and through four-way valve 76 to conduit 86 to drive hydraulic motor 45 in the opposite direction, with the hydraulic fluid exhausting out through conduit 83 into and through four-way valve 76 to the opposite side thereof and into conduit 74 to pass through valve 68 into discharge conduit 85 which leads to the reservoir 70. The reversing of the motor 45 will reverse the movement of the conveyor chains 40 so as to release locks 22 and move the container 26 downward to the "bottomed" position of the masts 12, which container is then moved outward to the position it originally occupied, as hereinbefore set out, whereupon, the container is disconnected from the masts and the masts are moved inwardly into a position adjacent the body 2 to enable the vehicle to be moved over the road. When the rollers 16, between the flanges 13–14, "bottom" and the lever 90 may then be moved to the opposite parallel slot in plate 90A and moved arcuately to close switch 69 so as to direct electrical current from conductor E through switch 69 and conductor 68B to solenoid 68C of four-way valve 68 the circuit is complete through a ground to move the four-way valve 68 into a position to direct hydraulic fluid, under pressure, from conduit 74 through four-way valve 68 into conduit 84 to cause plunger 78 to be extended outward and by lowering the masts 12 slightly, the hooks 24 will be disengaged from the rollers 28 to permit the container 26 to be seated in the position it heretofore occupied. With the container being disconnected from the downwardly facing hooks 24, the masts 12 are moved inwardly into close relation with the body 2 to enable the vehicle to be operated over the road.

When it is desired to pick up a container 26 the switch lever 90 is moved laterally in the slot of switch plate 90A until transverse member 92 on shaft 91 is above switches 69 and 69A, the lever 90 is then moved arcuately so that the transverse member 92 will depress normally open switch 69 to close a circuit and direct electricity from conductor E through switch 69 and conductor 69B to solenoid 68C, which is a grounded circuit. This will divert hydraulic fluid from conduit 74 to and through four-way valve 68 into conduit 84 to extend plunger 78, with the hydraulic fluid exhausting from the opposite end of the cylinder to and through four-way valve 68 into conduit 74 leading to return conduit 85 so as to direct hydraulic fluid through filter 87 into reservoir 70 to complete the cycle. As hereinbefore brought out, the plunger 78 is retracted to move the container 26 toward the vehicle body to be dumped in the manner hereinbefore set out.

After the refuse has been dumped from the container 26 into the hollow body 2, the accumulated material within the body may be moved toward the discharge end gate 2A by moving three-position switch 94 from the "off" position to the "on" position, as shown in FIG. 11, to close the circuit from battery B through conductor 96B to direct current to solenoid 96D connected to four-way valve 96, which will direct hydraulic fluid from reservoir 70 into a conduit leading to pump 98, whereupon the pump will direct hydraulic fluid, under pressure, into conduit 100 to and through four-way valve 96 into conduit 102 which leads to cylinder 104 to move plungers 106 and 108 outwardly, as shown in FIG. 11, which will move packer plate 110 into contact relation with the refuse or garbage within body 2 to compress the material therein. The hydraulic fluid is exhausted from the opposite end of cylinder 104 into conduit 112, thence to and through four-way valve 96 to the opposite side thereof to discharge into discharge conduit 85 leading to reservoir 70.

By moving the three-position switch 94 through an "off" position to another "on" position, current is directed from battery B through conductor E and switch 94 to and through conductor 96A to solenoid 96 of four-way solenoid actuated valve 96 to move the four-way valve to the opposite position which will direct fluid out from reservoir 70 through conduit to pump 98, under pressure, to conduit 100. With the four-way valve 96 in this position, hydraulic fluid will be directed to and through valve 96 into conduit 112 into the opposite end of cylinder 104 to retract plungers 106 and 108 in a manner well known in the art of hydraulic cylinders, with the hydraulic fluid being directed from the opposite end of cylinder 104 into conduit 102 to and through four-way hydraulic valve 106 to the opposite side thereof into discharge conduit 85, filter 87 and into reservoir 70.

The battery B is shown to be connected so as to conduct electricity through the various switches 69, 69A, 89, 89A and 90 through electrical conductor E to the various elements operated by electricity which are grounded and back to the ground of battery B.

As the hollow body 2 is filled with refuse, garbage or other material, this material is moved toward the discharge end of the body, which is closed by door 2A. The material which is moved toward the discharge end of the body 2 is moved by packer plate 110 which is secured to the distal end of plunger 108 which plunger 108 is telescoped into plunger 106 and cylinder 104 is of such length and power that, upon opening the door 2A which is connected to the body 2 by hinge 2B, the refuse is discharged by the hydraulic plungers upon moving the switch 94 to the position as shown in FIG. 11, whereupon, the hydraulic cylinders and packer plate 110 are moved to the position as shown in FIG. 11. The opening 2C in the upper side of body 2 is in spaced transversely aligned relation with upright masts 12, so upon the masts elevating the container 26, these will be dumped into the hollow body 2 rearward of the rear face of packer plate 110.

What is claimed is:

1. An operator controlled mechanism for attachment to the side of a vehicle, which vehicle has an open top body, which mechanism mechanically engages, elevates, dumps, lowers and replaces a container, which mechanism comprises:
   a. a mounting frame secured to a side of the vehicle and extending below the body thereof at least partially thereacross,
      1. a support member mounted on said mounting frame for longitudinal movement relative thereto,
   b. upright mast means on the outer end of said support member,
   c. container engaging means mounted on said upright mast means to selectively engage a container,
      1. said upright mast means on said support member being movable with said support member,
   d. power means connected to said support member and to said mounting frame to move said upright mast means and said container engaging means outwardly to engage a container preparatory to moving the container inward,
      1. said power means adapted to move said mast means, said container engaging means and the container inward to a position to be elevated,
   e. upright, power actuated conveyor means mounted on said mast means and connected to said container engaging means for moving
      1. the container above the open top of the vehicle body for dumping the container, when the conveyor means is in one position,
      2. said conveyor means being adapted to move the container to a position near the lower end of said conveyor means to another position prior to the placement of the container in a selected position,
   f. said power means being adapted to move said mast means, said container engaging means and the container outwardly after said container engaging means and the container have been lowered to place the container in a selected position, 1. said power means also being adapted to move said mast means and said container engaging means inwardly adjacent a side of the vehicle.

2. An operator controlled mechanism for attachment to the side of a vehicle, as defined in claim 1; wherein
   a. said mounting frame has a roller mounted on the lower side thereof near the outer end to engage said support member in rolling relation,
      1. a further roller mounted on the upper side of said mounting frame intermediate the length thereof and being in rolling engagement with said support member so as to minimize friction between said mounting frame and said support member upon movement thereof.

3. An operator controlled mechanism for attachment to a side of a vehicle, as defined in claim 1; wherein
   a. said upright mast means comprises spaced apart, upright mast members rigidly secured together, said mast members each having an outer face with inturned flanges on at least a portion thereof, said flanges extending arcuately at least 180° around the upper portion of said mast members so as to form a cam track, and wherein
      1. a container lock is pivotally mounted on each of said mast members and is connected with a cam actuated means on said conveyor means,
      2. said cam actuated means on said conveyor means being movable when said cam actuated means moves onto the arcuate portions of said flanges to move said lock into abridging relation with respect to said container engaging means and with the container to maintain the container against disengagement with the conveyor means when in inverted position.

4. An operator controlled mechanism for attachment to the side of a vehicle, as defined in claim 1 wherein said power means includes:
   a. a hydraulic cylinder which is connected to said support member and to said mounting frame to move said support member longitudinally relative thereto; and
   b. valve means to selectively control the flow of hydraulic fluid to and from said hydraulic cylinder.

5. An operator controlled mechanism for attachment to a side of a vehicle, as defined in claim 3 wherein said conveyor means includes:
   a. a pair of parallel shafts mounted on said mast members, inward from the inturned flanges thereof, near each end of said mast members, one of which shafts is power driven,
   b. pairs of spaced apart sprockets mounted on each said shaft, inward from the respective inturned flanges thereof, with pairs of said sprockets being in driving alignment for rotation of said sprockets about the respective axes thereof,
   c. a conveyor chain surrounding each pair of said aligned sprockets,
   d. motor means connected in driving relation with one of said shafts to drive said sprockets, and wherein said mast members each has:
   e. a second flange located a spaced distance inward from the outer inturned flanges thereof and being substantially parallel with said inturned flanges on the straight-away length of said inturned flanges, and wherein said conveyor means also includes
      1. guide rollers mounted on each of said conveyor chains and positioned intermediate associated ones of said inturned flanges and said second flanges to guide said container engaging means on said mast members, and wherein said container engaging means includes:
   f. a transverse member pivotally supported on said conveyor chains, and
      1. container engaging members near the ends of said transverse member, and wherein said mechanism includes:
      2. a container having complementary members to interengage with said container engaging members,
      3. said locks being adapted to prevent relative movement between said complementary members and said container engaging members when the container is in inverted position.

6. An operator controlled mechanism for attachment to a side of a vehicle, as defined in claim 5 including:
   a. an abutment mounted on the rear side of each said mast member near the top thereof to form a bumper; and
   b. a complementary abutment plate on each said conveyor chain to complementally engage said abutments that form said bumpers to form stops for said conveyor chains.

7. An operator controlled mechanism for attachment to a side of a vehicle, as defined in claim 5, wherein said container engaging members are detachably connected to said transverse member to enable the interchanging of said container engaging members to selectively pick up containers with different complementary members.

8. An operator controlled mechanism for attachment to a side of a vehicle, as defined in claim 5; wherein said container engaging members each includes: a pair of horizontal, vertically spaced apart members spaced outward from each end of said transverse member to receive hooks thereon; and wherein said complementary members on said container comprises:
   a pair of vertically spaced apart hooks on each side thereof to engage said vertically spaced apart horizontal members on each end of said transverse member.

9. An operator controlled mechanism for attachment to a side of a vehicle, as defined in claim 4 including:
   a pump;
   conduits connecting said pump to said hydraulic cylinder for supplying hydraulic fluid thereto;
   solenoid valves for controlling the supply of said hydraulic fluid from said pump through said conduits to said hydraulic cylinder;
   electrical circuits, including a source of electricity, connected to the solenoids of said solenoid valves;
   a first normally open switch within one said electrical circuit to close the circuit to energize a first solenoid to actuate a valve to control the flow of hydraulic fluid through said conduit into one end of said cylinder and to control the discharge of said hydraulic fluid into a conduit from the opposite end of said cylinder, when in one position;
   a second normally open switch connecting another of said circuits to the second solenoid of said solenoid valves;
   a normally open switch within said second circuit to direct electricity to said second solenoid to energize said solenoid to actuate said valve to direct hydraulic fluid through one of said conduits into the other end of said hydraulic cylinder and to direct hydraulic fluid outward, through another of said conduits, from the opposite end of said cylinder; and an operating lever to selectively close only one of said switches at a time, and means to maintain said operating lever out of engagement with said switches when the lever is not manually operated.

10. An operator controlled mechanism for attachment to a side of a vehicle, as defined in claim 9 including:

a second pair of circuits, including a source of electricity;

another solenoid valve having a pair of solenoids thereon, one solenoid thereof being in each of said second pair of circuits, third and fourth normally open switches, one in each of said second pair of circuits;

a hydraulic motor connected to said conveyor means; and conduits connecting said hydraulic motor to said another solenoid valve, whereby upon closing one of said third and fourth switches to energize one of said solenoids in said another solenoid valve said another solenoid valve will be moved to direct hydraulic fluid, under pressure, into one of said motor conduits to said hydraulic motor, and whereby hydraulic fluid will be directed out of another of said motor conduits so as to rotate the motor in one direction and upon closing the other of said third and fourth switches, the other of said pair of solenoids will be energized to move said another solenoid valve to another position to direct hydraulic fluid, under pressure, to said another of said motor conduits with the hydraulic fluid exhausting through said one motor conduit to rotate the hydraulic motor in the opposite direction, so as to selectively move said conveyor means in the desired direction, said lever being adapted to be moved to a position to depress one or the other of said third and fourth normally open switches to enable the hydraulic motor to be rotated in the selected direction.

11. In combination with a vehicle having power supply means and a hollow body having an elevated access opening, apparatus for emptying the contents of a container into said hollow body of the vehicle through said elevated access opening, comprising:

a. elevator means to raise and lower said container, said elevator means including a guide track defined by flange means having a curved upper end adjacent said elevated access opening and a lower end adjacent a surface supporting the container, b. means connecting said elevator means to said power supply means to move said flange means over said surface between a first position closely adjacent said vehicle and a second position spaced outwardly from said vehicle and closely adjacent said container, and c. container engaging means on said elevator means to mechanically engage said container when said flange means is moved to said second position by said power supply means.

12. A combination as stated in claim 11, wherein a. said elevator means is mounted on a side of said vehicle; and b. wherein at least said lower end of said flange means moves laterally outwardly from said side of said vehicle.

13. In combination with a vehicle having power supply means and a hollow body having an elevated access opening, apparatus for emptying the contents of a container into said hollow body of the vehicle through said elevated access opening, comprising:

a. elevator means to raise and lower said container, said elevator means having an upper end adjacent said elevated access opening and a lower end adjacent a surface supporting the container, b. means connecting said elevator means to said power supply means to move at least said lower end of said elevator means over said surface between a first position closely adjacent said vehicle and a second position spaced outwardly from said vehicle and closely adjacent said container, and c. container engaging means connected to said elevator means to mechanically engage said container when said elevator means is moved to said second position by said power supply means, said elevator means comprising:

1. mounting frame means secured to said vehicle;

2. support member means movably mounted on said mounting frame means, said support member means including a free end extending outwardly of said vehicle, said connecting means connecting said vehicle power supply means to said support member means.

3. upright mast means mounted on said free end of said support member means, said upper and lower ends of said elevator means being provided on said upright mast means, 4. power-actuated conveyor means mounted on said mast means and extending from said lower end to said upper end thereof, said container engaging means being connected to said power-actuated conveyor means; and 5. motor means connecting said power-actuated conveyor means to said vehicle power supply means to move said power-actuated conveyor means, when carrying said container, to selected positions.

14. A combination as stated in claim 13 including means for releasably connecting said container engaging means to said conveyor means.

15. A mechanically-actuated loading arrangement, comprising:

a. a vehicle adapted to travel over a surface upon which a container of material is stationed, said vehicle having a body portion provided with an elevated opening and including power supply means;

b. a container stationed on said surface adjacent the path-of-travel of said vehicle, said container including means for releasably coupling said container to a container pick-up means; and c. container loader means connected to said vehicle for moving outwardly over said surface from said vehicle to said container, engaging said container, lifting said container to said opening, emptying said container and lowering said container to said surface, said container loader means including:

1. mast means movably mounted on said vehicle, said mast means having an upper end adjacent said elevated opening and a lower end adjacent said surface, said mast means including flange means forming a track means from said lower end to said upper end of said mast means;

2. container pick-up means movably mounted on said mast means and including roller means engageable with said flange means for guiding said container pick-up means along said track means, said container pick-up means also including container engaging means adapted to engage said coupling means on said container for releasably connecting said container to said container pick-up means;

3. conveyor means connected to said container pick-up means for moving said container pick-up means along said track means; and 4. means connecting said mast means to said power supply means for moving said lower end of said mast means from a position closely adjacent said vehicle to a position closely adjacent said container, whereby said container engaging means will engage said coupling means on said container when said container pick-up means is positioned at said lower end of said mast means.

16. A mechanically-actuated loading arrangement as stated in claim 15 wherein said flange means includes: spaced-apart inner and outer flanges forming a channel for said roller means, at least one of said flanges being interrupted adjacent said upper end of said mast means, whereby said roller means may be swung out of the plane of said channel when said container pick-up means and said container are swung toward said opening to empty said container.

17. A mechanically-actuated loading arrangement as stated in claim 15 wherein said mast means and said container pick-up means include:
a pair of spaced-apart mast members each having a pair of inner and outer flanges forming a channel for said roller means; and
mounting bar means positioned between said spaced-apart mast members, said roller means including at least one roller connected to each end of said mounting bar means.

18. A mechanically-actuated loading arrangement as stated in claim 15 wherein said means connecting said mast means to said power supply means comprises hydraulic cylinder means.

19. A mechanically-actuated loading arrangement as stated in claim 15 including container lock means and means for bringing said container lock means, said container coupling means and said container engaging means into locked relationship with each other, whereby said container may be inverted without becoming disconnected from said container engaging means.

20. A mechanically-actuated loading arrangement as stated in claim 15 wherein one of said container coupling means and said container engaging means includes roller means and the other of said container coupling means and said container engaging means includes hook means.

21. A mechanically-actuated loading arrangement as stated in claim 15 wherein said container coupling means includes hook means and wherein said container engaging means includes roller means engageable in said hook means.

22. In combination with a vehicle having power supply means and a hollow body having an elevated access opening, apparatus for emptying the contents of a container into said hollow body of the vehicle through said elevated access opening, comprising:

a. elevator means on said vehicle to raise and lower said container, said elevator means including means defining an upstanding guide track having an upper end adjacent said elevated access opening and a lower end adjacent a surface supporting the container and container holding means movable along said guide track, b. means connecting said elevator means to said power supply means to move at least said lower end of said guide track over said surface between a first position closely adjacent said vehicle and a second position spaced outwardly from said vehicle and closely adjacent said container, and c. container engaging means on said container holding means to mechanically engage said container when said lower end of said guide track is moved to said second position by said power supply means.

23. A method of mechanically loading material into a vehicle having an elevated opening and upright mast means movably mounted on said vehicle and having an upper end positioned adjacent said opening and a lower end adjacent a surface over which said vehicle travels, comprising the steps of:
positioning a container of material on said surface adjacent the path-of-travel of said vehicle, said container including coupling means for connecting said container to said lower end of said upright mast means;
positioning said vehicle adjacent said container with said lower end of said upright mast means in alignment with said coupling means on said container;
moving said lower end of said upright mast means over said surface and into engagement with said coupling means, whereby said container is connected to said lower end of said upright mast means;
moving said container along said upright mast means from said lower end to said upper end thereof; and
tipping said container toward said opening.

* * * * *